Feb. 20, 1951 F. W. ROSS 2,542,946
AIRPLANE CONTROL SYSTEM
Filed Nov. 15, 1947
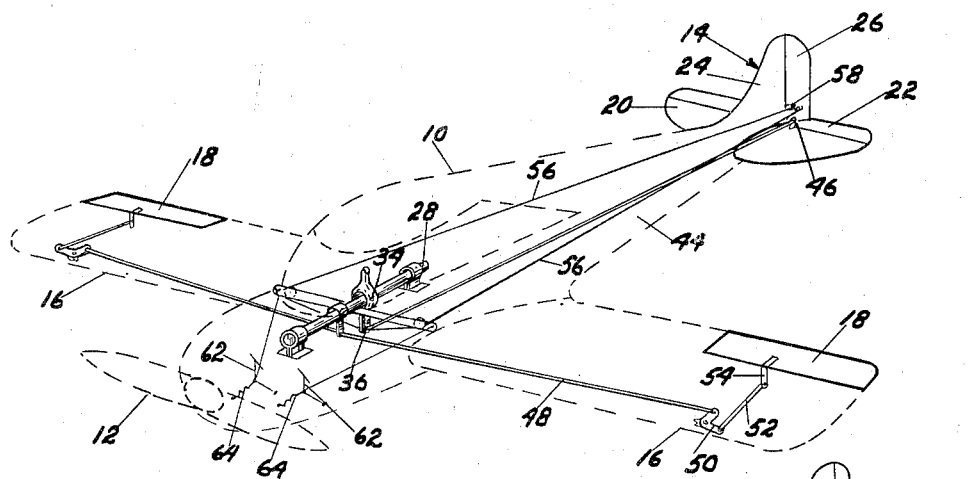
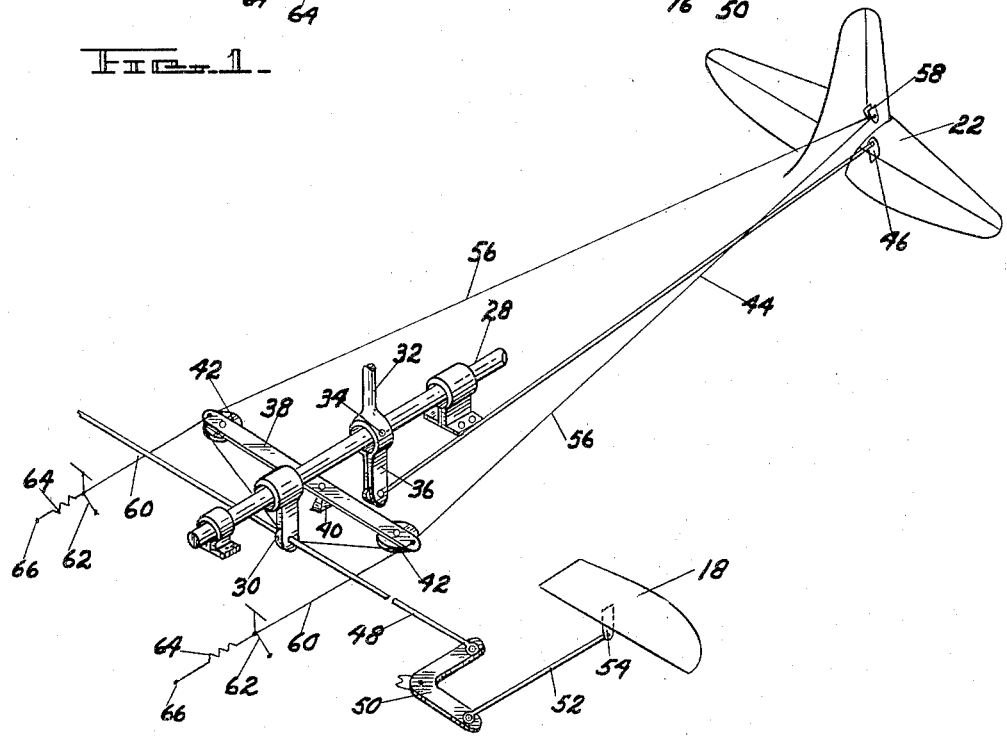
INVENTOR.
FREDERICK W. ROSS
BY
ATTORNEYS Patented Feb. 20, 1951

2,542,946

UNITED STATES PATENT OFFICE 2,542,946

AIRPLANE CONTROL SYSTEM

Frederick W. Ross, Dearborn, Mich.

Application November 15, 1947, Serial No. 786,294

2 Claims. (Cl. 244—83)

This invention relates to airplanes, and more particularly to an aerodynamic control system thereof including roll control, yaw control, and pitch control having characteristics that reduce the skill required to pilot an airplane and also reduce the dangers of piloting the airplane.

All airplanes, in order to be maneuvered while flying in the air and during take-off and landing, have devices to control the angular position of the airplane with respect to the surrounding air and ground. These devices are known collectively in the art as aerodynamic control system, and when used in conjunction with engine controls provide means for guiding the airplane through all maneuvers.

The aerodynamic control system consists of three principal controls which are referred to by those skilled in the art as a roll control, such as an aileron, to control the roll angle of the airplane, a yaw control, such as a rudder, to control the yaw angle, and a pitch control, such as an elevator, to control the pitch angle or angle of attack of the airplane with respect to the oncoming air.

In maneuvering an airplane by these aerodynamic controls in conjunction with the engine controls, it is necessary for the pilot to coordinate properly the amount of and the time of application of each control during each instant of each maneuver. In particular, the coordination of the roll control with the yaw control, which is necessary in order to perform a true-banked or properly coordinated turn, requires considerable skill and much practice on the part of the pilot, is difficult to master, and has been a source of danger, the pilot often failing to coordinate properly at a time when the dangers of a spin are imminent. The incident invention aims to improve the characteristics of the aerodynamic control system referred to so as to reduce the pilot skill required, reduce the time required to learn to pilot, and to reduce the dangers of piloting an airplane.

An object of the invention is to provide an aerodynamic control system with roll control and yaw control operable from a single control lever in combination with an independent yaw control.

Another object of the invention is to provide an aerodynamic control system with a roll control and a yaw control operable by a single control means which bestows upon the airplane increased safety and performance.

Other objects and advantages of the invention will appear from the following description when considered in connection with the drawings forming a part of this specification and in which:

Fig. 1 is a perspective view of an airplane illustrating the system as installed, and Fig. 2 is a diagrammatical view of the system.

Referring to the drawings for more specific details of the invention 10 represents a fuselage having suitable housing facilities for a pilot and passengers, and also suitable housing for a power plant, not shown, for driving a propeller 12. The fuselage also carries conventional empennage 14.

Oppositely disposed wings 16 of like structure are secured to the fuselage and ailerons 18 are hinged to the trailing edges of the wings, and the wings support a main landing gear, not shown, preferably of the retractible type.

The empennage consists of conventional fixed horizontal surfaces 20 arranged in oppositely disposed relation with corresponding movable elevator surfaces 22 hinged to the trailing edges thereof, and a fixed vertical fin 24 with a movable rudder 26 hinged to the trailing edge of the fin.

A torque tube 28 suitably supported for rotation substantially longitudinally in the fuselage 10 has fixedly secured thereto an arm 30, and a control stick 32 pivotally supported on the torque tube as by a pin 34 has a dependent arm 36. The control stick may be swung forward and aft on the pivot pin 34 or moved axially in either direction so as to rotate the torque tube on its axis.

A cross bar 38 pivoted on a fixed member 40 of the main frame of the fuselage supports a pair of sheaves 42 arranged in spaced relation to one another and to the pivotal axis of the cross bar.

The dependent arm 36 of the control stick is connected by a push-pull rod 44 to a horn 46 fixedly secured to the elevator 22 so that fore and aft movements may deflect the elevator.

The arm 30 on the torque tube is connected by corresponding oppositely extended push-pull rods 48 to one arm of corresponding oppositely arranged bell cranks 50 pivotally mounted on the frame structures of the wings 16, and the other arms of the bell cranks are connected as by rods or links 52 to horns 54 fixedly secured to the ailerons 18.

The arm 30 is also connected by corresponding cables 56 mounted for travel on the sheaves 42 supported on the cross bar 38 to a horn 58 fixedly secured to the rudder 26, the oppositely disposed ends of the cross bar 38 are connected as by cables 60 to conventional foot pedal levers 62 and retractile springs 64 connected between the pedals and fixed supports 66 serve to return the pedals to retracted position and also serve to return the cross bar to its neutral position.

The control system of this invention is operative in the following manner:

By movement of the control stick 32 aft the elevator may be deflected to the desired magnitude.

The relationship of the ruddr control and the aileron control is such that by proper arrangement of the control stick 32 magnitudes the rudder and the ailerons may be deflected to obtain approximately the correct proportions of yaw and roll so that a turn approximating a true-banked turn can be made to either the right or left. The advantages, simplicity and safety, of what is termed a two-control system by those skilled in the art, are apparent.

In addition by pressing on one or the other of the pedals 62 the pilot can obtain independent control of the rudder 26 to effectively yaw the airplane for side-slipping and for use in cross wind landing.

The advantage of the control system of this invention is that the pilot has independent aerodynamic control about all three axes, namely, pitch, yaw, and roll and that the very difficult operation of close coordination between roll and yaw control which is necessary for a conventional three-control system is eliminated. Furthermore, extreme simplification of the control operations are obtained without restriction in any way.

While this invention has been described in connection with certain specific embodiments, the principle involved is susceptible of numerous other applications that will readily occur to persons skilled in the art.

Having thus described the various features of the invention, what I claim as new and desire to secure by Letters Patent is:

1. In an airplane having ailerons, a rudder and an elevator, a control system therefor including a rotatable torque tube, a control stick pivoted on the torque tube for rotation of the tube and for swinging movements forward and backward, an arm fixedly secured to the torque tube, a bar supported on a pivot, said pivot being located in a vertical plane passing through the axis of the torque tube, spaced sheaves on the bar, linkage connecting the arm to the ailerons, cables mounted for travel on the sheaves and serving to connect the arm to the rudder, foot pedal levers connected to the bar, means for retracting the levers and a rod connecting the control stick to the elevator.

2. In an airplane having ailerons, a rudder and an elevator, a control system therefor including a rotatable torque tube, a control stick pivoted on the torque tube for rotation of the tube and for swinging movements forward and backward, an arm fixedly secured to the torque tube, a pivoted cross bar, spaced sheaves on the cross bar, linkage connecting the arm to the ailerons, cables mounted for travel on the sheaves and serving to connect the arm to the rudder, a push-pull rod connecting the control stick to the elevator, foot pedal levers connected to the respective ends of the cross bar and springs connected to the pedals effective to return the pedals to neutral position and to balance the cross bar.

FREDERICK W. ROSS.

REFERENCES CITED

The following references are of record in the file of this patent:

UNITED STATES PATENTS

| Number | Name | Date |
|---|---|---|
| 2,340,237 | Upson | Jan. 25, 1944 |
| 2,442,289 | Garehime | May 25, 1948 |

FOREIGN PATENTS

| Number | Country | Date |
|---|---|---|
| 323,881 | Germany | Aug. 11, 1920 |